US 7,865,641 B2

(12) United States Patent
Risse

(10) Patent No.: US 7,865,641 B2
(45) Date of Patent: Jan. 4, 2011

(54) SYNCHRONIZATION AND SCHEDULING OF A DUAL MASTER SERIAL CHANNEL

(75) Inventor: Gerhard Risse, München (DE)

(73) Assignee: Qimonda AG, Munich (DE)

( * ) Notice: Subject to any disclaimer, the term of this patent is extended or adjusted under 35 U.S.C. 154(b) by 1075 days.

(21) Appl. No.: 11/540,009

(22) Filed: Sep. 29, 2006

(65) Prior Publication Data

US 2008/0080564 A1      Apr. 3, 2008

(51) Int. Cl.
G06F 13/00 (2006.01)
G06F 3/00 (2006.01)
G05B 19/18 (2006.01)
G09G 5/39 (2006.01)

(52) U.S. Cl. .............................. 710/100; 710/6; 710/61; 710/110; 710/124; 700/3; 345/531; 345/532

(58) Field of Classification Search ...................... 710/6, 710/124; 345/531, 532
See application file for complete search history.

(56) References Cited

U.S. PATENT DOCUMENTS

| 5,311,512 | A | 5/1994 | Bartis et al. |
| 5,742,186 | A | 4/1998 | Nakamura |
| 6,868,486 | B1 * | 3/2005 | Ward ........................ 711/158 |
| 7,046,622 | B2 | 5/2006 | Ying et al. |
| 7,065,039 | B2 | 6/2006 | Ying |
| 7,099,994 | B2 * | 8/2006 | Thayer et al. ................ 711/114 |
| 7,246,186 | B2 * | 7/2007 | Hall et al. .................... 710/124 |
| 7,277,988 | B2 * | 10/2007 | Gower et al. ................. 711/118 |
| 7,489,638 | B2 * | 2/2009 | Keslassy et al. ............. 370/238 |
| 2005/0080961 | A1 | 4/2005 | Bedwell et al. |
| 2005/0080966 | A1 | 4/2005 | Cruz et al. |
| 2006/0041859 | A1 | 2/2006 | Vrancic et al. |
| 2006/0053211 | A1 | 3/2006 | Kornerup et al. |
| 2007/0198764 | A1 | 8/2007 | Risse |

FOREIGN PATENT DOCUMENTS

DE    10 2006 006571     8/2007

OTHER PUBLICATIONS

AMD-8131 HyperTransport PCI-X Tunnel Data Sheet; 87 pages, Aug. 10, 2004.*

* cited by examiner

*Primary Examiner*—Brian T Misiura
(74) *Attorney, Agent, or Firm*—Dicke, Billig & Czaja, PLLC

(57) ABSTRACT

One embodiment provides a system including a communications channel, a first channel master, and a second channel master. The first channel master is configured to obtain latency values and maintain a first schedule of data traffic on the communications channel based on the latency values. The second channel master is configured to obtain the latency values and maintain a second schedule of data traffic on the communications channel based on the latency values. The first channel master manages data on the communications channel via the first schedule and the second channel master manages data on the communications channel via the second schedule.

14 Claims, 6 Drawing Sheets

SYNCHRONIZATION AND SCHEDULING OF A DUAL MASTER SERIAL CHANNEL

BACKGROUND

Typically, a computer system includes a number of integrated circuits that communicate with one another to perform system applications. Often, the computer system includes one or more host controllers and one or more electronic subsystem assemblies, such as a dual in-line memory module (DIMM), a graphics card, an audio card, a facsimile card, and a modem card. To perform system functions, the host controller(s) and subsystem assemblies communicate via communication links, such as serial communication links and parallel communication links.

Typically, serial communication link protocols allow only one memory controller to access the devices on the serial channel. The memory controller is referred to as a channel master and the devices on the serial channel are referred to as channel slaves. As most servers have multiple processor sockets, the memory controller can be one external component that is accessed by the multiple processing units. This approach adds latency due to the front side bus connecting the memory controller to the processing units.

If a memory controller is integrated into a processing unit, the unit has direct access to only a part of the memory, namely the memory directly connected. If the memory connected to the other memory controller has to be accessed, the access comes with added latency. Some companies are working on switch fabrics that allow different memory controllers to access the whole memory space, which means small additional latency but increased cost and complexity.

Another solution includes a serial bus with two master memory controllers. Usually, busses which allow two master memory controllers, such as HyperTransport™, have internal queues which allow the reordering and prioritization of data packets. These queues increase latency and are not suitable for a memory interface whose performance depends heavily on decreased latency.

For these and other reasons there is a need for the present invention.

SUMMARY

The present disclosure describes a system having multiple channel masters that manage data on a communications channel. One embodiment provides a system including a communications channel, a first channel master, and a second channel master. The first channel master is configured to obtain latency values and maintain a first schedule of data traffic on the communications channel based on the latency values. The second channel master is configured to obtain the latency values and maintain a second schedule of data traffic on the communications channel based on the latency values. The first channel master manages data on the communications channel via the first schedule and the second channel master manages data on the communications channel via the second schedule.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
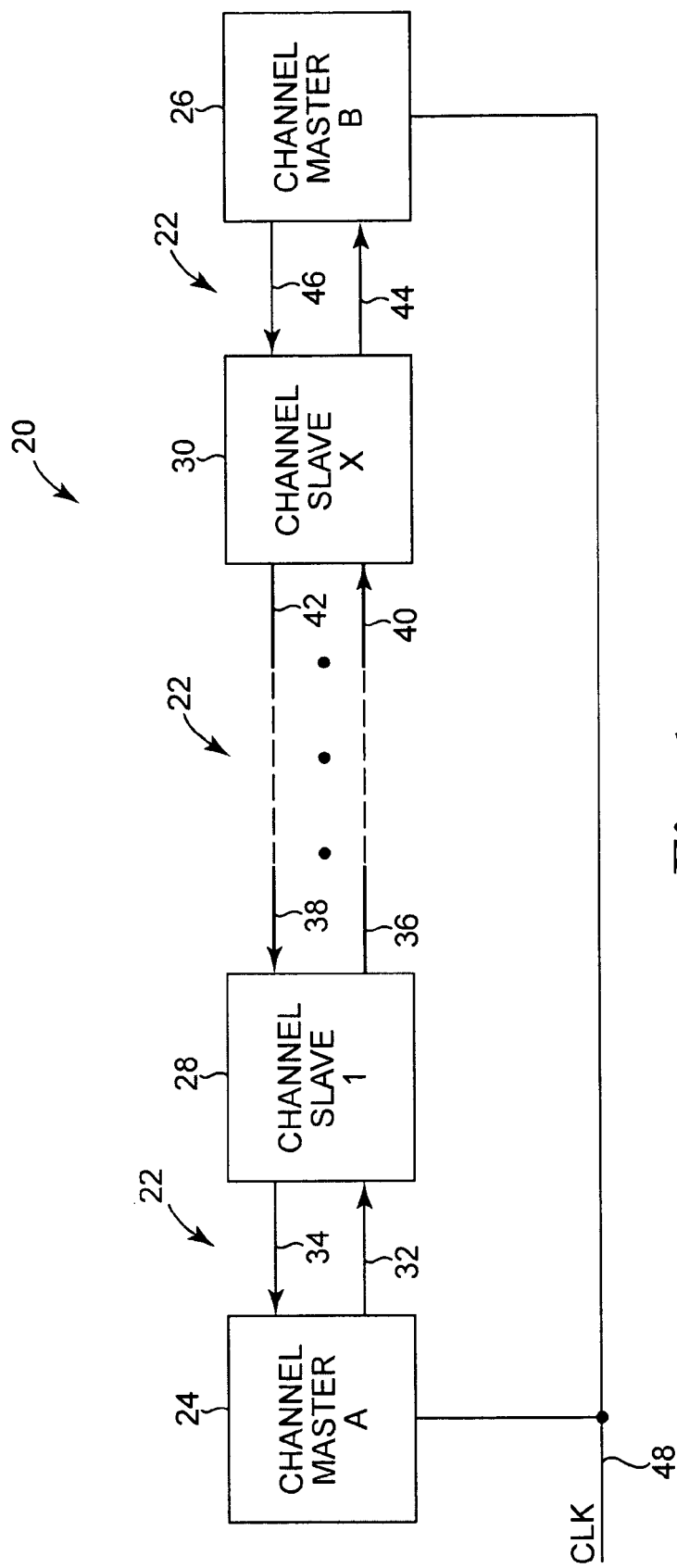
FIG. 1 is a diagram illustrating one embodiment of an electronic system, according to the present invention.

FIG. 1 is a diagram illustrating one embodiment of an electronic system 20, according to the present invention. Electronic system 20 includes a communications channel 22, channel master A at 24, channel master B at 26, channel slave 1 at 28, and other channel slaves, up to channel slave x at 30. Channel master A at 24 and channel master B at 26 are coupled to communications channel 22 and control data traffic on communications channel 22.

Channel master A at 24 and channel master B at 26 manage data on communications channel 22 without using internal queues that allow the reordering and prioritization of data packets. Channel master A at 24 and channel master B at 26 are synchronized to the same frame count. Channel master A at 24 and channel master B at 26 obtain latency values, which are round trip delay times for commands and responses between channel master A at 24 and channel master B at 26 and each of the channel slaves, channel slave 1 at 28 through channel slave x at 30. Channel master A at 24 maintains a schedule of data traffic on communications channel 22 by using the latency values to schedule responses to commands from channel master A at 24 and channel master B at 26. Channel master B at 26 maintains a schedule of data traffic on communications channel 22 by using the latency values to schedule responses to commands from channel master A at 24 and channel master B at 26. Channel master A at 24 manages data on communications channel 22 via the maintained schedule in channel master A at 24. Channel master B at 26 manage data on communications channel 22 via the maintained schedule in channel master B at 26.

Channel master A at 24 is electrically coupled to channel slave 1 at 28 via communication paths 32 and 34. Channel slave 1 at 28 is electrically coupled to other channel slaves via communication paths 36 and 38. Each of the other channel slaves is electrically coupled to adjacent channel slaves via other communication paths up to channel slave x at 30, which is electrically coupled to the other channel slaves via communication paths 40 and 42. Channel slave x at 30 is electrically coupled to channel master B at 26 via communication paths 44 and 46. Channel master A at 24 and channel master B at 26 receive clock signal CLK via clock path 48.

Communications channel 22 includes communication paths 32, 34, 36, 38, 40, 42, 44, and 46. Data travels in the direction from channel master A at 24 toward channel master B at 26 via communication paths 32, 36, 40, and 44. Data travels in the direction from channel master B at 26 toward channel master A at 24 via communication paths 46, 42, 38, and 34. In one embodiment, communications channel 22 is a serial communications channel. In other embodiments, communications channel 22 is any suitable type of communications channel and any suitable communications protocol is implemented on communications channel 22.

Channel master A at 24 and channel master B at 26 control data traffic for the channel slaves, including channel slave 1 at 28 and channel slave x at 30, on communications channel 22. In one embodiment, channel master A at 24 is a memory controller integrated into a central processing unit chip. In one embodiment, channel master B at 26 is a memory controller integrated into a central processing unit chip. In one embodiment, channel master A at 24 is an external memory controller that may be accessed via one or more central processing units. In one embodiment, channel master B at 26 is an external memory controller that may be accessed via one or more central processing units.

Channel slaves, including channel slave 1 at 28 through channel slave x at 30, are memory modules on communications channel 22. In other embodiments, the channel slaves can be any suitable devices on communications channel 22.

Channel master A at 24 and channel master B at 26 provide synchronization of the channel masters, latency measurements to obtain the latency values, scheduling of data traffic on communications channel 22 based on the latency values, and signals on communications channel 22 based on the schedules. Channel master A at 24 and channel master B at 26 receive clock signal CLK at 48. In other embodiments, channel master A at 24 and channel master B at 26 receive different clock signals.

In synchronization of channel masters, one of the channel masters is designated a synchronization master and the other is designated a synchronization slave. In one embodiment, the channel master having a higher serial number is designated the synchronization master. In one embodiment, the channel master having the lower socket identification number is designated the synchronization master. In other embodiments, any suitable criteria can used to designate which of the channel masters is synchronization master and which is synchronization slave.

In synchronization of channel master A at 24 and channel master B at 26, channel master A at 24 is designated the synchronization master and channel master B at 26 is designated the synchronization slave. Channel master A at 24 transmits channel master A frame information, frame number n, to channel master B at 26. Channel master B at 26 responds immediately by transmitting channel master B frame information, frame number m, to channel master A at 24. Channel master A at 24 receives the response from channel master B at 26 in channel master A frame number n+i. Channel master A at 24 calculates the round trip latency of i frames and transmits this latency information to channel master B at 26. Channel master A at 24 transmits actual frame information, frame number p, to channel master B at 26, which sets channel master B frame counter to frame number p+(i/2).

Channel master A at 24 and channel master B at 26 provide read latency measurements for each of the channel slaves, including channel slave 1 at 28 through channel slave x at 30, to obtain the latency values. In other embodiments, channel master A at 24 and channel master B at 26 can obtain the latency values in any suitable manner, such as by having the latency values programmed into channel master A at 24 and channel master B at 26.

Channel master A at 24 transmits a read request to channel slave 1 at 28 in frame number n. Channel slave 1 at 28 responds to the read request. Channel master A at 24 receives the response from channel slave 1 at 28 in frame number n+j. Channel master A at 24 calculates a latency value of j for the round trip read request and response from channel slave 1 at 28. Channel master A at 24 measures and calculates a latency value for each of the channel slaves on communications channel 22, including channel slave x at 30. For channel slave x at 30, channel master A at 24 transmits a read request to channel slave x at 30 in frame number m. Channel slave x at 30 responds to the read request. Channel master A at 24 receives the response from channel slave x at 30 in frame number m+k. Channel master A at 24 calculates a latency value of k for the round trip read request and response from channel slave x at 30. Channel master A at 24 stores the measured latency values, such as j and k, and transmits the measured latency values to channel master B at 26. Channel master B at 26 receives the measured latency values from channel master A at 24 and stores the received latency values.

Channel master B at 26 transmits a read request to channel slave 1 at 28 in frame number n'. Channel slave 1 at 28 responds to the read request. Channel master B at 26 receives the response from channel slave 1 at 28 in frame number n'+j'. Channel master B at 26 calculates a latency value of j' for the round trip read request and response from channel slave 1 at 28. Channel master B at 26 measures and calculates a latency value for each of the channel slaves on communications channel 22, including channel slave x at 30. For channel slave x at 30, channel master B at 26 transmits a read request to channel slave x at 30 in frame number m'. Channel slave x at 30 responds to the read request. Channel master B at 26 receives the response from channel slave x at 30 in frame number m'+k'. Channel master B at 26 calculates a latency value of k' for the round trip read request and response from channel slave x at 30. Channel master B at 26 stores the measured latency values, such as j' and k', and transmits the measured latency values to channel master A at 24. Channel master A at 24 receives the measured latency values from channel master B at 26 and stores the received latency values. Each of channel master A at 24 and channel master B at 26 have the latency values for read latency from each of channel master A at 24 and channel master B at 26 to each of the channel slaves on communications channel 22.

Each of the channel masters, channel master A at 24 and channel master B at 26, builds or maintains a channel master schedule based on their own requests and remote requests from the other channel master. Channel master A at 24 maintains a channel master A schedule based on channel master A requests and remote requests from channel master B at 26.

Channel master B at 26 maintains a channel master B schedule based on channel master B requests and remote requests from channel master A at 24.

Each of the channel masters uses their own channel master schedule to prevent their requests from being overwritten and to recognize responses to their requests. Channel master A at 24 uses the channel master A schedule to prevent channel master A requests from being overwritten and to recognize responses to channel master A requests. Channel master B at 26 uses the channel master B schedule to prevent channel master B requests from being overwritten and to recognize responses to channel master B requests.

In one example of maintaining a channel master schedule, the latency value for channel master A at 24 and channel slave x at 30 is k=4. To maintain the channel master A schedule, channel master A at 24 provides a read request in frame number n to channel slave x at 30 and schedules a read response slot in the channel master A schedule at frame n+4. This read response slot indicates that the read response from channel slave x at 30 will be received in frame n+4. Channel master A at 24 recognizes that the read response in frame n+4 is from channel slave x at 30.

In another example of maintaining a channel master schedule, the round trip latency for channel master A at 24 and channel master B at 26 is i=6 and the latency value for channel master B at 26 and channel slave 1 at 28 is k'=5. In maintaining the channel master A schedule, channel master A at 24 receives a read request from channel master B at 26 in frame n+1. This read request was transmitted from channel master B at 26 in frame (n+1)−(i/2) or frame n−2. Channel master A at 24 schedules a read response slot in the channel master A schedule at frame (n+1)−(i/2)+k' or frame n+3. Channel master A at 24 uses the channel master A schedule to avoid having requests with data, such as a write request to channel slave x at 30, overwritten by the remote read response in frame n+3.

Figure 2:
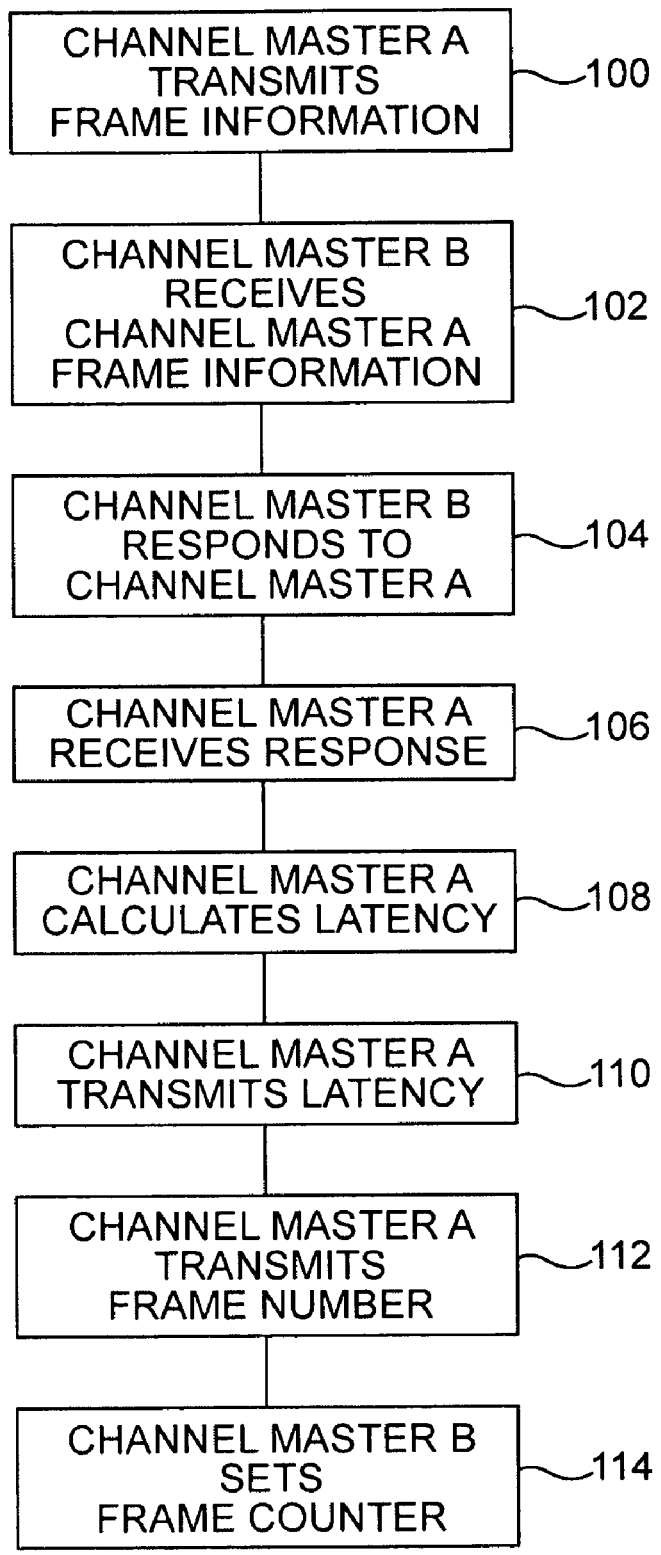
FIG. 2 is a flow diagram illustrating synchronization of two channel masters in one embodiment of an electronic system.

FIG. 2 is a flow diagram illustrating synchronization of channel master A at 24 and channel master B at 26 in one embodiment of electronic system 20. Channel master A at 24 is designated the synchronization master and channel master B at 26 is designated the synchronization slave.

At 100, channel master A at 24 transmits channel master A frame information to channel master B at 26. At 102, channel master B at 26 receives the channel master A frame information and at 104 channel master B at 26 responds immediately by transmitting channel master B frame information to channel master A at 24. At 106, channel master A at 24 receives the response from channel master B at 26 in channel master A frame number n+i. At 108, channel master A at 24 calculates the round trip latency of i frames and at 110 transmits this latency information to channel master B at 26. At 112, channel master A at 24 transmits actual frame information, frame number p, to channel master B at 26, which sets channel master B frame counter to frame number p+(i/2) at 114.

Figure 3A:
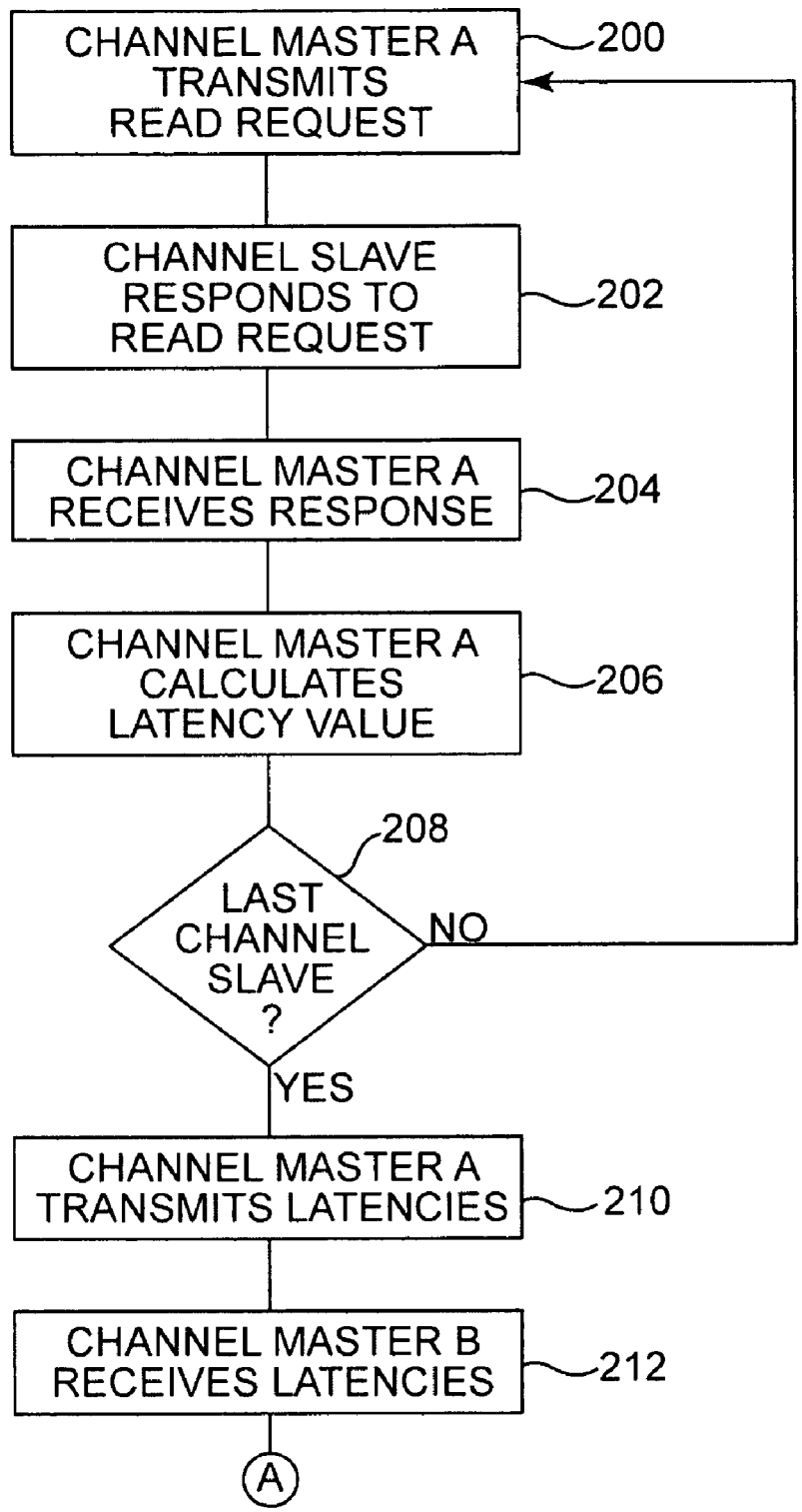
FIG. 3A is a flow diagram illustrating a channel master obtaining latency values for each of the channel slaves coupled to a communications channel.
Figure 3B:
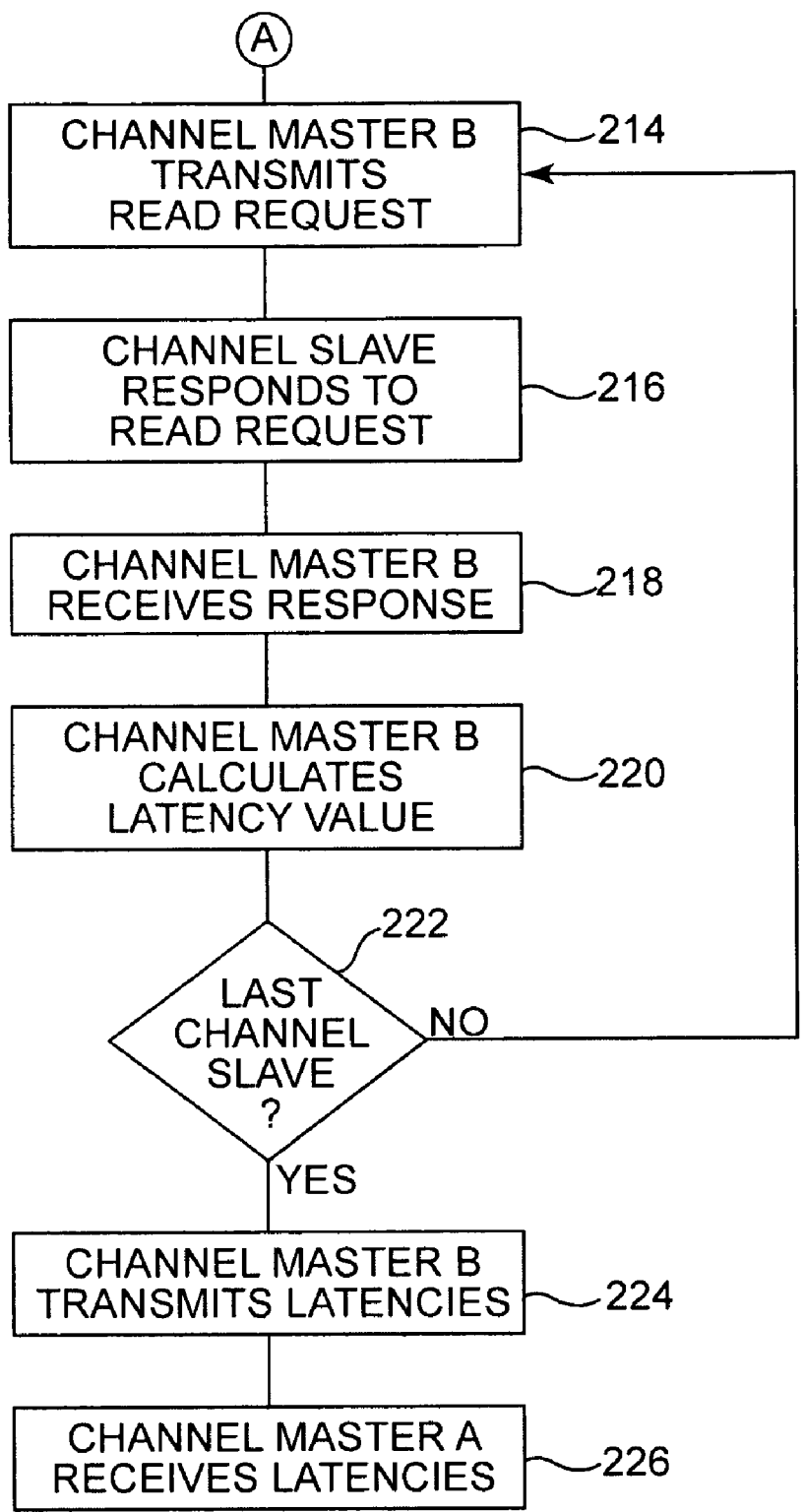
FIG. 3B is a flow diagram illustrating another channel master obtaining latency values for each of the channel slaves coupled to the communications channel.

FIGS. 3A and 3B are flow diagrams illustrating channel master A at 24 and channel master B at 26 obtaining latency values in one embodiment of electronic system 20.

FIG. 3A is a flow diagram illustrating channel master A at 24 obtaining latency values for each of the channel slaves, including channel slave 1 at 28 through channel slave x at 30. At 200, channel master A at 24 transmits a read request to a channel slave, such as channel slave 1 at 28, in frame number n. The addressed channel slave responds to the read request at 202. At 204, channel master A at 24 receives the response from the channel slave in frame number n+j. At 206, channel master A at 24 calculates a latency value of j for the round trip read request and response from the channel slave. At 208, channel master A at 24 checks to see if a latency value has been obtained for all channel slaves. If not, channel master A at 24 proceeds at 200 to transmit a read request to the next channel slave. After latency values have been obtained for all channel slaves, channel master A at 24 stores the measured latency values and at 210 transmits the measured latency values to channel master B at 26. At 212, channel master B at 26 receives the measured latency values from channel master A at 24 and stores the received latency values. Processing continues at A in FIG. 3B.

FIG. 3B is a flow diagram illustrating channel master B at 26 obtaining latency values for each of the channel slaves, including channel slave 1 at 28 through channel slave x at 30. At 214, channel master B at 26 transmits a read request to a channel slave, such as channel slave 1 at 28, in frame number n'. The addressed channel slave responds to the read request at 216. At 218, channel master B at 26 receives the response from the channel slave in frame number n'+j'. At 220, channel master B at 26 calculates a latency value of j' for the round trip read request and response from the channel slave. At 222, channel master B at 26 checks to see if a latency value has been obtained for all channel slaves. If not, channel master B at 26 proceeds at 214 to transmit a read request to the next channel slave. After latency values have been obtained for all channel slaves, channel master B at 26 stores the measured latency values and at 224 transmits the measured latency values to channel master A at 24. At 226, channel master A at 24 receives the measured latency values from channel master B at 26 and stores the received latency values.

Figure 4:
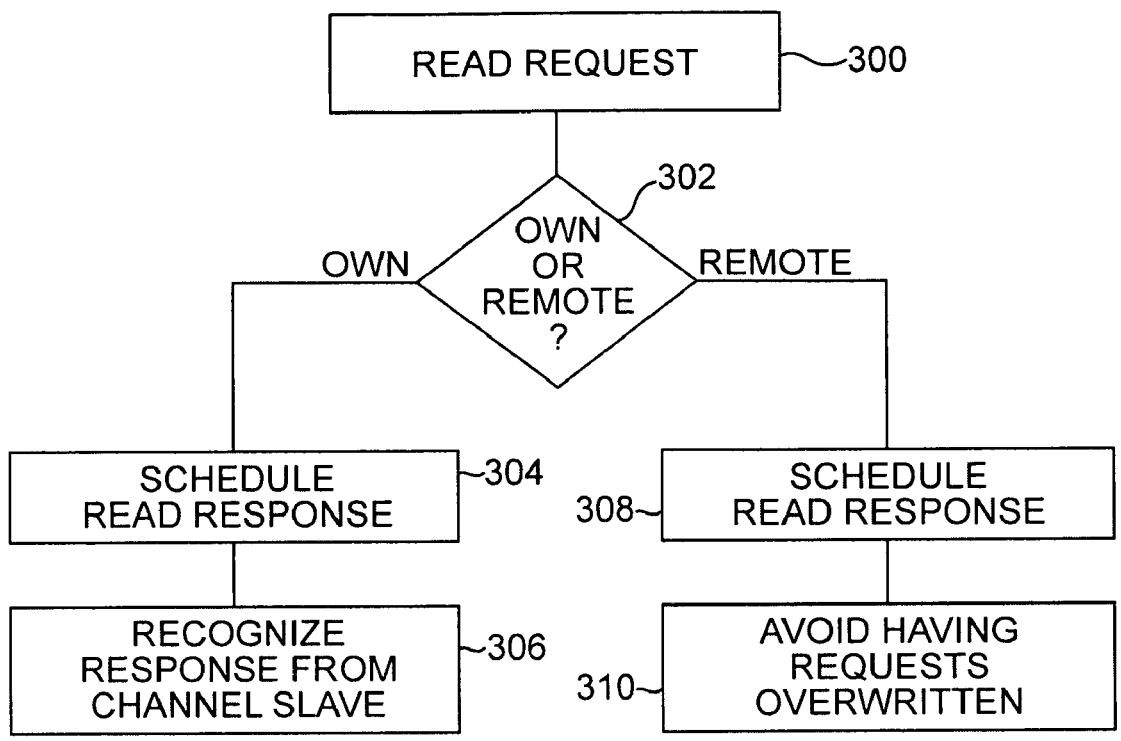
FIG. 4 is a flow diagram illustrating the handling of a read request in one embodiment of a channel master.

FIG. 4 is a flow diagram illustrating the handling of a read request in one embodiment of a channel master, such as channel master A at 24 and/or channel master B at 26. The read request at 300 is handled by the channel master, which determines at 302 whether the read request is one of the channel master's own read requests or a read request received from a remote channel master.

If the read request is one of the channel master's own read requests, the channel master schedules a read response slot in the channel master's schedule at 304. The read response from the addressed channel slave will arrive at the channel master in the read response slot. At 306, the channel master recognizes the read response from the addressed channel slave based on the scheduled read response slot.

If the read request is received from a remote channel master, the channel master that receives the read request schedules a read response slot in its channel master schedule at 308. This read response slot indicates which channel slave was addressed by the remote channel master and the frame number that will contain the read response from the addressed channel slave. The read response is received in the frame number at the remote channel slave. At 310, the channel master that received the read request uses the scheduled read response slot to avoid transmitting requests having data, such as write requests, that would be overwritten by the read response from the addressed channel slave.

Figure 5:
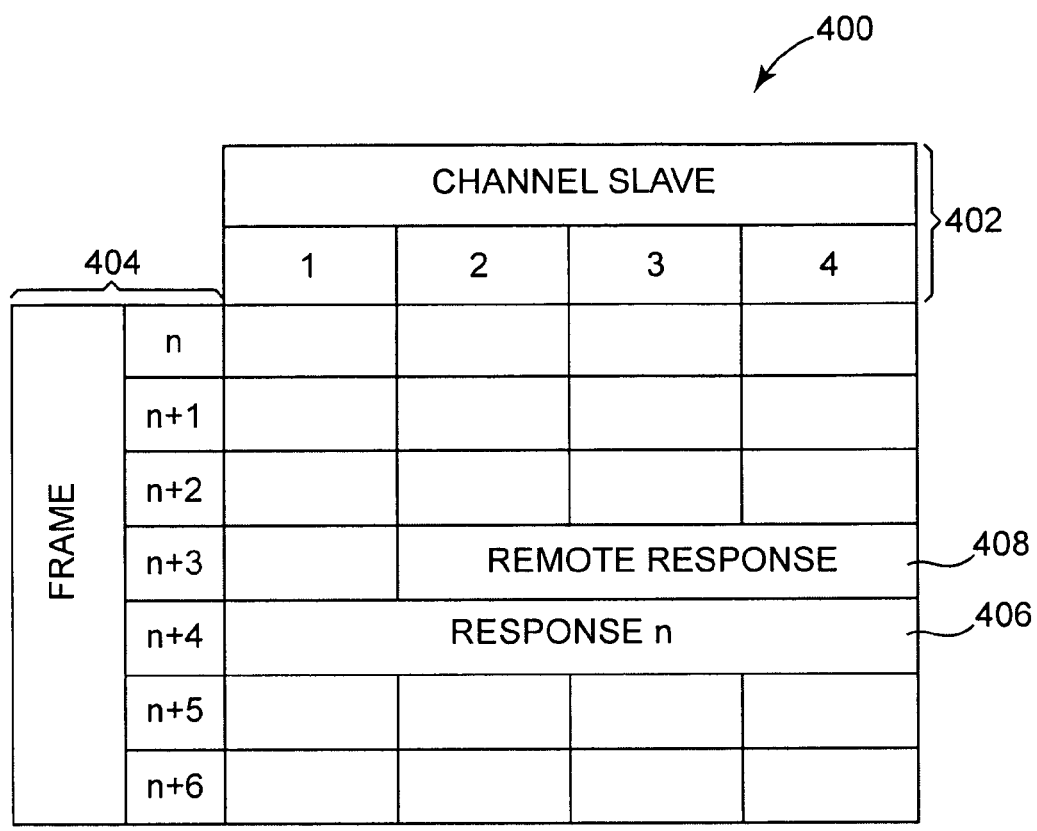
FIG. 5 is a table illustrating a channel master schedule in one embodiment of a channel master.

FIG. 5 is a table 400 illustrating a channel master A schedule in one embodiment of channel master A at 24. The table includes four channel slaves 1-4, indicated at 402, and seven frame numbers n through n+6, indicated at 404. The system includes channel master A at 24 and channel master B at 26.

In this example of maintaining a channel master A schedule, the round trip latency for channel master A at 24 and channel master B at 26 is i=6, the latency value for channel master A at 24 and channel slave 4 is k=4, and the latency value for channel master B at 26 and channel slave 1 is k'=5.

Channel master A at 24 provides a read request in frame number n to channel slave 4 and schedules a read response slot at 406 in the channel master A schedule at frame n+4. The read response slot at 406 indicates that the read response from channel slave 4, to the read request of frame number n, will be received in frame n+4. Channel master A at 24 recognizes that the read response in frame n+4 is from channel slave 4.

Channel master A at 24 receives a read request from channel master B at 26 in frame n+1. This read request was transmitted from channel master B at 26 in frame (n+1)−(i/2) or frame n−2. Channel master A at 24 schedules a read response slot at 408 in the channel master A schedule at frame (n+1)−(i/2)+k' or frame n+3. Channel master A at 24 uses the channel master A schedule to avoid having requests with data, such as write requests to channel slaves 2-4, overwritten by the remote read response in frame n+3.

By measuring latency values in a dual channel master system the responsibility for scheduling data transmissions to prevent overwriting the data can be passed to the channel masters. Channel master scheduling also allows the channel master to schedule requests such that the requests are overwritten after the frame has reached its previous destination. In addition, the dual channel master system, including channel master A at 24 and channel master B at 26, manage data on communications channel 22 without using internal queues.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
   a communications channel;
   a first channel master configured to obtain latency values and maintain a first schedule of data traffic on the communications channel based on the latency values;
   a second channel master configured to obtain the latency values and maintain a second schedule of data traffic on the communications channel based on the latency values, wherein the first channel master manages data on the communications channel via the first schedule and the second channel master manages data on the communications channel via the second schedule; and
   channel slaves, wherein the first channel master is configured to measure first read latencies for each of the channel slaves and the first channel master, and the second channel master is configured to measure second read latencies for each of the channel slaves and the second channel master, wherein the first channel master provides the first read latencies to the second channel master and the second channel master provides the second read latencies to the first channel master, and wherein the first channel master is configured to measure a round trip latency value for the first channel master and the second channel master, and the first channel master is configured to transmit the round trip latency value and a frame number to the second channel master that receives the round trip latency value and the frame number to synchronize frame counters in the first channel master and the second channel master.

2. The system of claim 1, wherein the first channel master uses the first schedule to provide first read requests on the communications channel and avoid having the first read requests overwritten and the second channel master uses the second schedule to provide second read requests on the communications channel and avoid having the second read requests overwritten.

3. The system of claim 2, wherein first response slots correspond to the first read requests and the first channel master includes the first response slots in the first schedule and second response slots correspond to the second read requests and the second channel master includes the second response slots in the second schedule.

4. The system of claim 3, wherein the first channel master receives the second read requests and includes the second response slots in the first schedule and the second channel master receives the first read requests and includes the first response slots in the second schedule.

5. The system of claim 1, wherein the first channel master issues first read requests that elicit first read responses in first response slots and the second channel master issues second read requests that elicit second read responses in second response slots.

6. The system of claim 5, wherein the first channel master provides the first response slots to the first schedule and uses the first schedule to receive the first read responses in the first response slots and the second channel master provides the second response slots to the second schedule and uses the second schedule to receive the second read responses in the second response slots.

7. The system of claim 5, wherein the first channel master is configured to receive the second read requests, provide the second response slots to the first schedule, and use the first schedule to avoid having the first read requests overwritten by the second read responses, and the second channel master is configured to receive the first read requests, provide the first response slots to the second schedule, and use the second schedule to avoid having the second read requests overwritten by the first read responses.

8. The system of claim 1, wherein the first channel master is configured to use each of the first latencies and each of the second latencies to provide data on the communications channel and the second channel master is configured to use each of the first latencies and each of the second latencies to provide data on the communications channel.

9. A system comprising:
   a communications channel;
   channel slaves configured to communicate data via the communications channel;
   a first master configured to measure first latencies for each of the channel slaves and the first master; and
   a second master configured to measure second latencies for each of the channel slaves and the second master, wherein the first master receives the second latencies from the second master and the second master receives the first latencies from the first master and the first master and the second master provide data on the communications channel based on the first latencies and the second latencies, and wherein the first master is configured to obtain a round trip latency value for the first master and the second master and transmit the round trip latency value and a frame number to the second master that receives the round trip latency value and the frame number to synchronize frame counters in the first master and the second master.

10. The system of claim 9, wherein the first master provides first read requests and schedules first read responses from the channel slaves based on the first latencies and the second master provides second read requests and schedules second read responses from the channel slaves based on the second latencies.

11. The system of claim 9, wherein the communications channel is a serial communications channel.

12. A method for communicating data on a communications channel, comprising:
- obtaining latency values;
- maintaining a first schedule of data communications based on the latency values;
- maintaining a second schedule of the data communications based on the latency values;
- managing first requests via the first schedule;
- managing second requests via the second schedule;
- responding to the first requests and the second requests via channel slaves;
- measuring first read latencies for each of the channel slaves and a first channel master;
- measuring second read latencies for each of the channel slaves and a second channel master;
- providing the first read latencies to the second channel master;
- providing the second read latencies to the first channel master;
- measuring, via the first channel master, a round trip latency value between the first channel master and the second channel master;
- transmitting, via the first channel master, the round trip latency value and a frame number to the second channel master;
- receiving, via the second channel master, the round trip latency value and the frame number; and
- synchronizing frame counters in the first channel master and the second channel master via the round trip latency value and the frame number.

13. The method of claim 12, wherein:
- managing first requests comprises avoiding overwriting the first requests; and
- managing second requests comprises avoiding overwriting the second requests.

14. The method of claim 12, wherein:
- managing first requests comprises receiving first responses to the first requests in first response slots; and
- managing second requests comprises receiving second responses to the second requests in second response slots.

* * * * *